United States Patent [19]

Gootee

[11] Patent Number: 5,253,923
[45] Date of Patent: Oct. 19, 1993

[54] SEAT ASSEMBLY HAVING WEDGED LOCKING MECHANISM

[76] Inventor: Leroy Gootee, 19187 Laurel, Livonia, Mich. 48152

[21] Appl. No.: 748,089

[22] Filed: Aug. 21, 1991

[51] Int. Cl.$^5$ .............................................. A47C 7/00
[52] U.S. Cl. ............................ 297/440.21; 297/440.1; 403/409.1
[58] Field of Search ...................... 297/440, 443, 444; 403/374, 370, 368, 409.1; 24/644, 136 R

[56]  References Cited

U.S. PATENT DOCUMENTS

| | | | |
|---|---|---|---|
| 2,547,789 | 4/1951 | Skeel | 403/370 |
| 3,633,949 | 1/1972 | Pfluger | 287/20.3 |
| 3,989,298 | 11/1976 | Cycowicz et al. | 297/443 X |
| 4,057,294 | 11/1977 | Krekeler | 299/93 |
| 4,395,071 | 7/1983 | Laird | 297/443 X |
| 4,669,911 | 6/1987 | Lundgren et al. | 403/409.1 X |
| 4,850,646 | 7/1989 | Wieland | 297/444 |
| 4,890,888 | 1/1990 | Kostin | 297/443 |
| 4,892,435 | 1/1990 | Anderson | 403/409.1 X |
| 5,005,908 | 4/1991 | Young | 297/443 |
| 5,156,442 | 10/1992 | Courtois | 297/443 |

Primary Examiner—James R. Brittain
Assistant Examiner—Milton Nelson, Jr.
Attorney, Agent, or Firm—Basile and Hanlon

[57] ABSTRACT

Devices for production line assembling of upholstered seat back units upon upholstered seat base units include a pair of rigid coupling bars secured at their lower ends to the seat base frame and projecting upwardly from opposite sides of the seat base. Within the seat back unit, a pair of housings fixed to the seat back frame at opposite sides at the bottom of the back are formed with coupling bar receiving recesses into which the coupling bars are inserted by a downward movement of the back unit relative to the base unit. Within the housings, a locking member having a locking projection receivable in a complementary locking recess in the coupling bar may be driven by a wedge member slidable within the housing from an inoperative position accommodating movement of the coupling bar into the housing to a locking position wherein the bar is positively locked to the housing. In one form the wedge member is actuated by a screw, in other forms the wedge member is spring-biased toward the locking position and releasably latched in an inoperative position by a latch member releasable by the insertion of the coupling bar into the housing. The housing is fabricated from two sheet metal stampings assembled to each other by a press fit and stitching or spot welded into a permanent assembly.

20 Claims, 5 Drawing Sheets

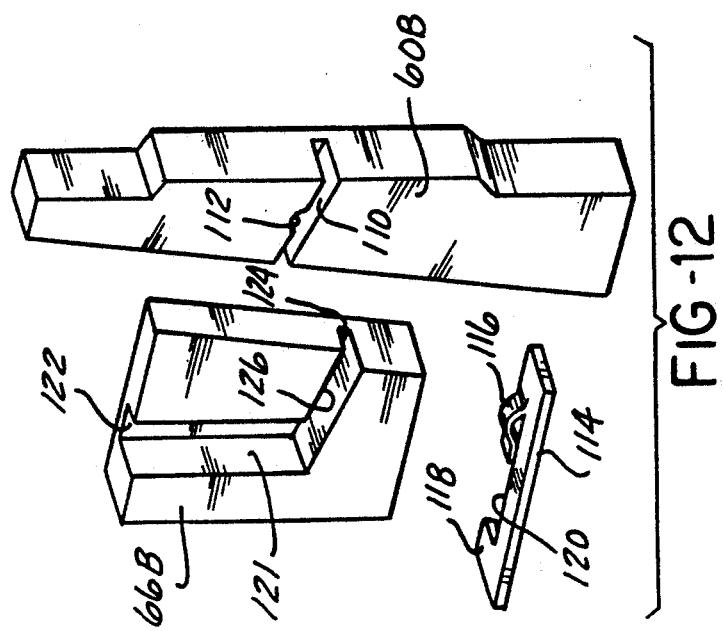
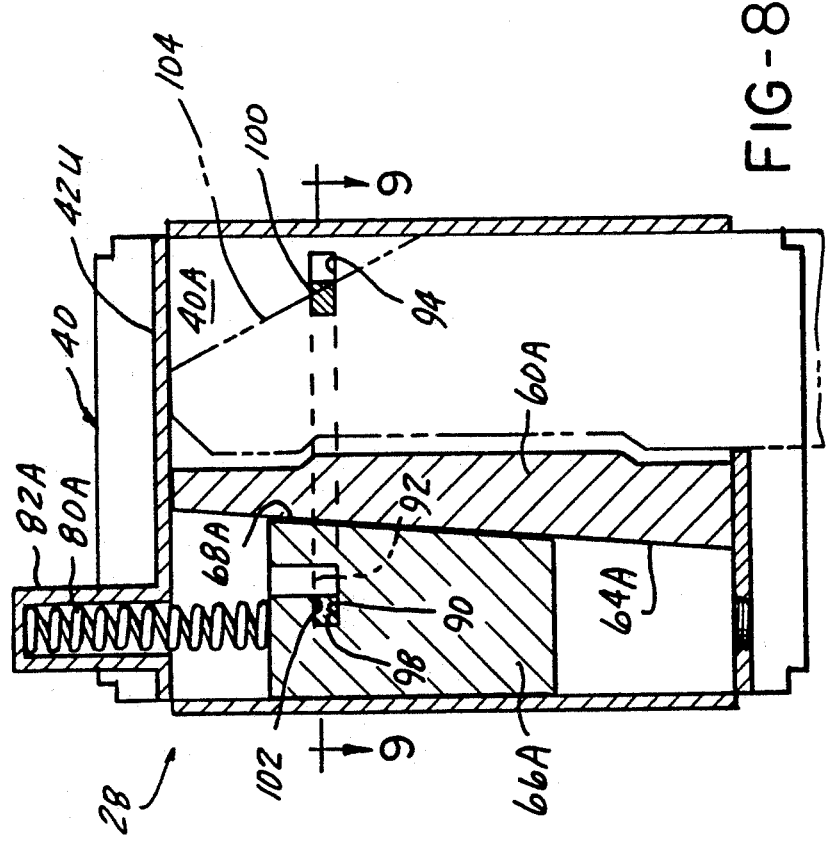
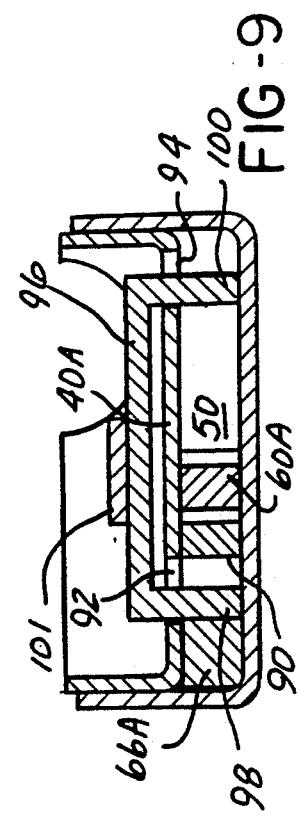
FIG-12
FIG-8
FIG-9

SEAT ASSEMBLY HAVING WEDGED LOCKING MECHANISM

BACKGROUND OF THE INVENTION

The present invention is directed to various forms of seat assemblies and is particularly concerned with structural arrangements which enable a simple and rapid assembly of an upholstered seat back to an upholstered seat base. Although well-adapted for use in other applications, the seat assemblies of the present invention find a primary application in the assembly of automotive vehicle seats in a production line setting.

Automotive seat assemblies normally are produced by fabricating the seat base and seat back independently from each other and assembling these two components to each other only after the components are in their completed, upholstered state. As is invariably the case with automotive vehicle components, the final assembly process, in this case the attaching of the completed seat back to the completed seat base, is performed on a production line. The attachment devices employed to attach the seat back to its base must be capable of being coupled tightly to each other in a minimum amount of time in a positive locking inter-engagement with each other which will remain interlocked in the face of vibration and shock loading, including crash loading. The devices must be made up of individual parts which can be cheaply and rapidly produced on a mass production basis. In that most present-day front seats in automobiles have provisions for tilting the back relative to the seat base, either to provide access to the rear seat of a two-door vehicle or to enable the seat back to be reclined, the attachment device should be equally well-adapted for use in mounting a tilting seat back on the base or alternatively being capable of attaching a seat back in a fixed position relative to the seat base.

This latter requirement is typically met by constructing the seat base with a rigid link-like coupling bar secured at its lower end to the seat base frame and projecting upwardly through the seat upholstery at each side of the rear portion of the seat base. The coupling bar may be pivoted at its lower end either directly or indirectly to the seat base frame or alternatively bolted or welded to the frame in those applications where tilting of the seat back is not required. The coupling elements mounted on the seat back usually take the form of housings fixedly mounted to the seat back frame at either side of the bottom portion of the frame. Each housing is formed with a recess which receives a coupling bar and detents, spring-loaded latches or wedging arrangements are employed which accommodate movement of the seat back to its assembled position relative to the seat base and to grip or positively lock the seat back to the base once it arrives in its final assembled position. For examples of such devices, see U.S. Pat. Nos. 4,890,888 and 5,005,908.

One of the difficulties with prior art devices resides in the fact that for sake of appearances, the seat back and seat base attaching assemblies, once joined, find the seat base coupling member received within a housing or bracket concealed within the interior of the seat back. In that the device is deliberately designed so that the back and seat base will remain assembled to each other in crash or roll-over situations, disassembly of the seat back from the seat base is, in many cases, impossible without cutting through the upholstery to expose the coupling units and then attempting to separate the base attached link from the seat back attached housing, a procedure which usually involves some brute force application to components which are not conveniently accessible, particularly at the inner sides of the seats.

The present invention is especially directed to structural arrangements for mounting a seat back unit upon a seat base unit in a manner which enables a substantially fool-proof positive locking of the two units to each other by simple and rapidly performed assembly steps while also including provisions for disassembling the back from the base.

SUMMARY OF THE INVENTION

Three forms of attachment devices for mounting seat backs on seat bases are disclosed. All forms of the invention utilize a rigid link-like coupling bar as that portion of the attachment device which is mounted on the seat base and a housing constituted by two nested sheet metal stampings which is welded to the seat back frame to receive the coupling bar of the seat base and positively lock the housing to the bar by a mechanism contained within the housing. The three forms of the invention differ primarily in the locking mechanism employed within the housing, although there are minor variances between the configurations of the coupling bar and housing between the various forms.

The coupling bar is a simple elongate rigid bar of rectangular transverse cross-section having one straight and continuous longitudinal side edge and a locking recess formed in its other longitudinal edge. Two coupling bars are secured at their lower ends to the seat base frame adjacent the rear corners of the seat base either directly via a pivot or fixed attachment or indirectly via a reclining mechanism to project upwardly through the seat base upholstery.

The housing is formed from two sheet metal stampings, both having a rectangular main wall and side and end wall portions bent through 90° from the side and end edges of the main wall. One of the two housing portions has semi-circular recesses cut into the exposed edges of the housing end walls to provide seats for receiving a tubular side frame member of the seat back to which this housing element is welded. The side wall portions of the other housing unit project forwardly from its base wall beyond the edges of its end walls. This second housing unit is mounted on the back of the first housing unit in a press-fitted piggyback-type assembly in which the side walls of the first housing unit are gripped between the side walls of the second unit with a press fit and spot welded or stitched into position. Locating tabs which project forwardly from the end walls of the second housing unit pass through slots in the base wall of the first housing unit to positively hold the two units against endwise movement relative to each other. When the two housing units are assembled a closed chamber-like recess is formed between the base walls of the two units, with the end walls of the second unit spacing the base wall of that unit from the back of the base wall of the first. Approximately half of the lower end wall of the second unit is cut away to form a slot-like opening into the recess dimensioned to enable a coupling bar mounted on the seat base to pass upwardly into the recess, with the continuous longitudinal straight edge of the coupling bar sliding along, the inner side of a side wall of the second housing unit. A mechanism for locking the coupling bar into assembled relationship with the housing is disposed in that portion of the chamber above the unslotted portion of the lower end wall on the second housing unit.

In all forms of the invention, this last mechanism includes a locking member extending between the upper and lower end walls of the second housing unit for sliding movement guided by these end walls toward and away from the locking recess in the longitudinal edge of a coupling bar which projects through the slot into the housing chamber. The edge of the locking member facing the coupling bar is formed with a locking projection of a shape complementary to that of the locking recess in the opposed edge of the coupling bar.

The opposite side edge of the locking member is inclined and a locking wedge is slidably received between this inclined edge of the locking member and the adjacent side wall of the second housing unit. The mechanisms are so arranged that the wedge is located in a position which allows the locking projection on the locking member to be located in a position which permits the coupling bar to be inserted into the chamber through the slot at the lower end of the recess and move upwardly in the recess until the upper end of the bar abuts the upper end wall of the recess. The wedge is then actuated to wedge the locking member toward the coupling bar to seat the locking projection on the locking member in the locking recess in the coupling bar to positively lock the bar against longitudinal movement or withdrawal from the housing.

The wedge may either be positioned by a screw threaded into the wedge which is tightened to wedge the locking member against the bar or alternatively various forms for latching the wedge member in a coupling bar receiving position are utilized. These latching devices take various forms, but both have the common feature of being released by the insertion of the coupling bar into the housing to enable a spring to drive the wedge to lock the parts in their assembled relationship.

Other objects and features of the invention will become apparent by reference to the following specifications and to the drawings.

Figure 4:
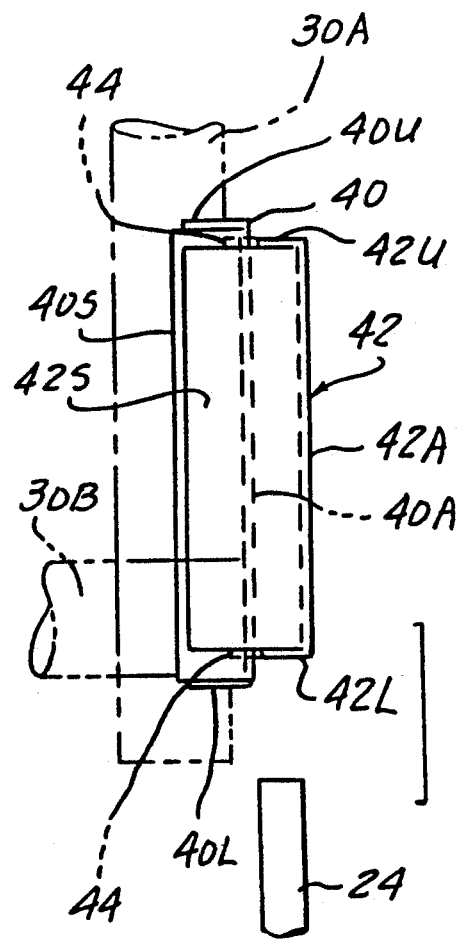
FIG. 4 is a side elevational view of the structure of FIG. 3.
Figure 6:
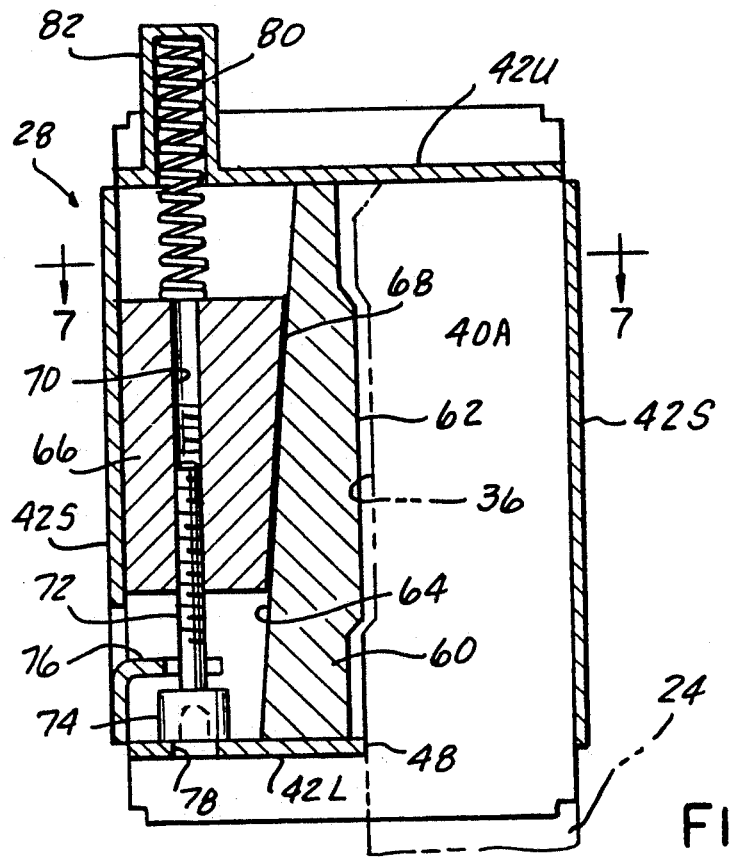
Figure 7:
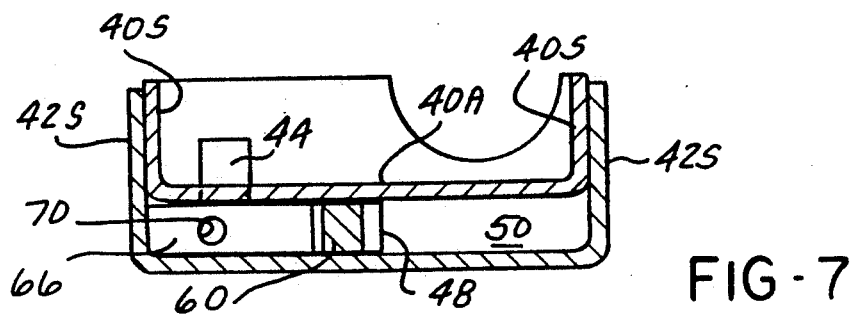
Figure 11:
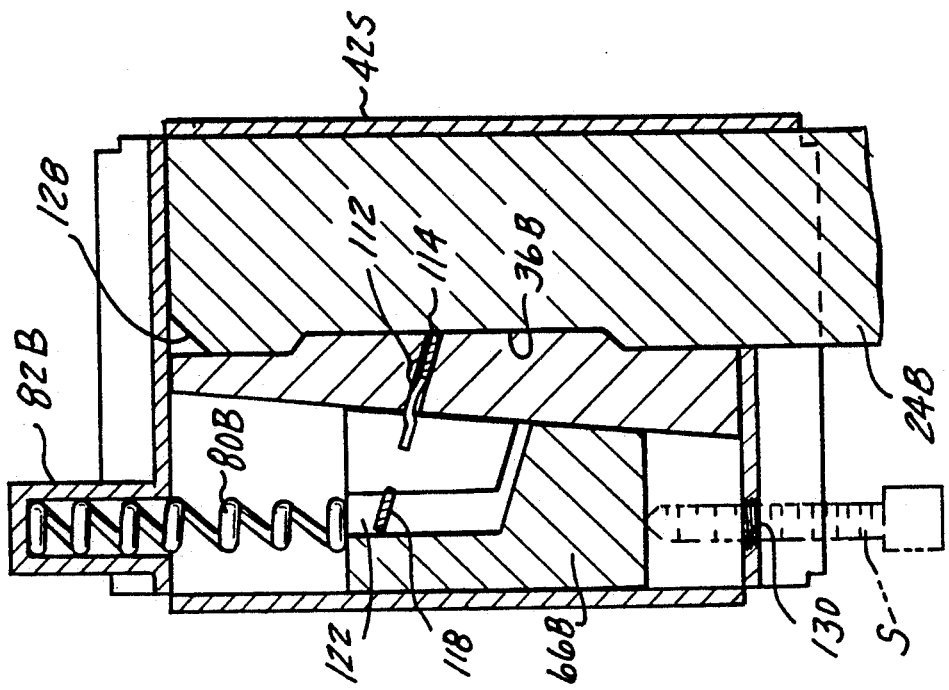
Figure 10:
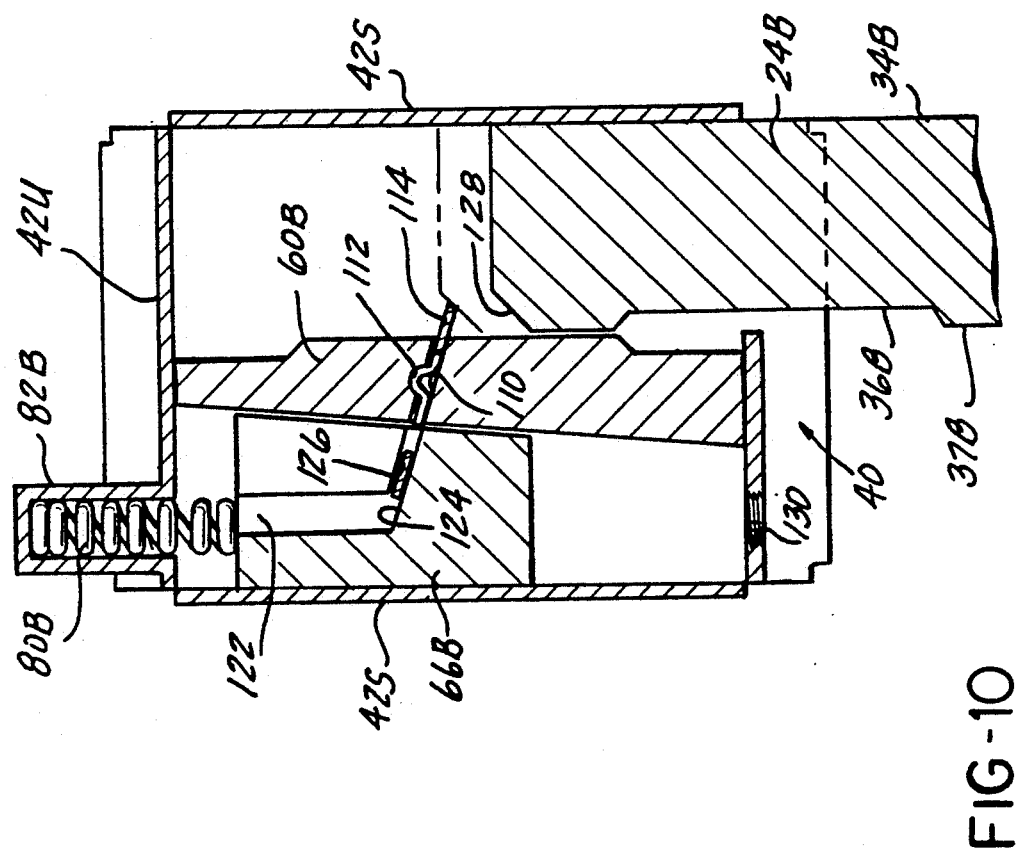

FIG. 6 a cross-sectional view of one form of locking mechanism embodying the present invention, this cross-section being taken on a just forwardly of the rearward end wall of the mechanism housing as shown in FIG. 4;

FIG. 7 is a cross-sectional view of the assembly of FIG. 6 taken on line 7—7 of FIG. 6;

FIG. 8 is a cross-sectional view corresponding to that of FIG. 6, showing a second form of the invention;

FIG. 9 is a detailed cross-sectional view of the device of FIG. 8 taken on line 9—9 of FIG. 8;

FIG. 10 is a detailed cross-sectional view corresponding to that of FIG. 6, showing a third form of the invention at the commencement of an assembling operation;

FIG. 11 is a cross-sectional view corresponding to Fig. 10, but showing the parts of the mechanism of FIG. 10 in their final assembled position; and FIG. 12 is an exploded perspective view of elements of the locking mechanism employed in the embodiment of FIGS. 10 and 11.

DETAILED DESCRIPTION OF THE PREFERRED AND ALTERNATIVE EMBODIMENTS OF THE INVENTION

Figure 1:
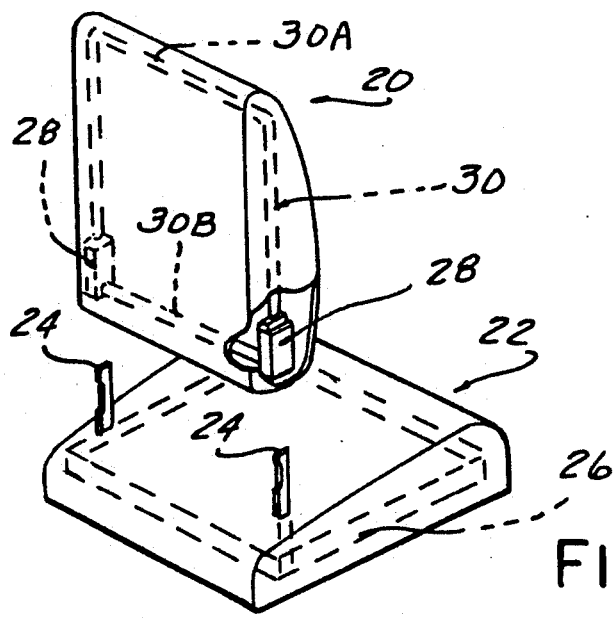
FIG. 1 is an exploded perspective view, with certain parts broken away, of a typical seat assembly according to the present invention.

Referring first to FIG. 1, one application of the present invention is found in the assembly of a completed, upholstered, seat back unit 20 to a completed, upholstered, seat base unit designated generally 22 to constitute a front seat assembly for an automotive vehicle. Structure embodying the present invention used in assembling the seat back and base to each other includes a pair of elongate rigid coupling bars 24 secured at their lower ends to the rear quarters of a seat base frame indicated generally in broken line at 26. Bars 24 may in some cases be fixedly secured to base frame 26 as by bolting or welding, however, more frequently the bars are mounted upon base frame 26 as at 32 (FIG. 2) for pivotal movement about a horizontal axis parallel to the rear edge of the seat base so that the assembled back may be tilted relative to the base. Alternatively one or both of the bars may form a part of a reclining mechanism which accommodates controlled reclining of the seat back relative to the base. A pair of coupling bar receiving housings designated generally as 28 are fixedly secured to the internal seat back frame 30 at the lower corners of the seat back.

Figure 2:
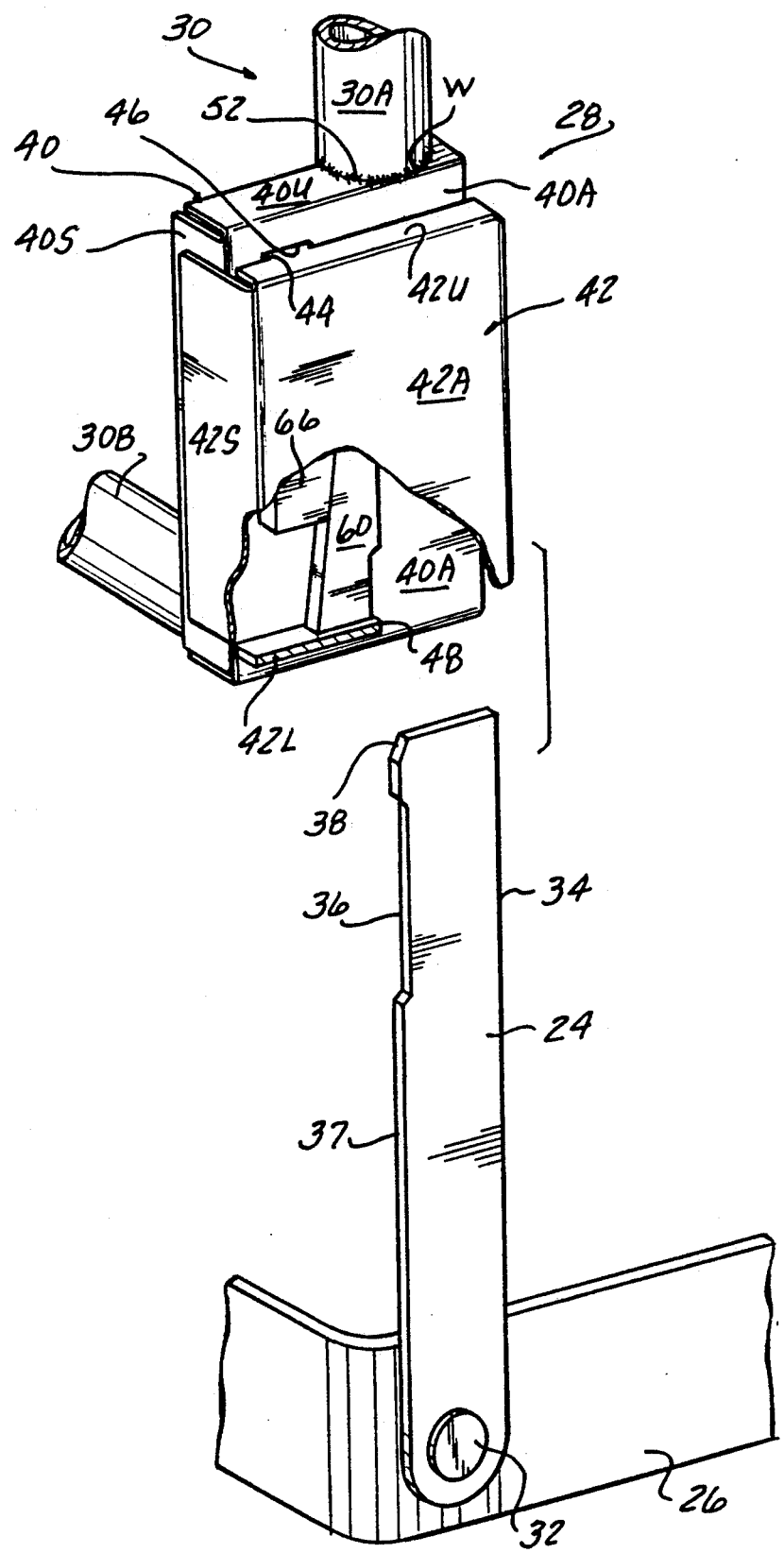
FIG. 2 is an exploded view showing a coupling bar and housing embodying the present invention coupled to a seat base frame and to a seat back frame, with certain parts broken away.

In FIG. 2 a more detailed view of the coupling bar 24 and mechanism housing 28 is shown, the coupling bar 24 being pivotally coupled at its lower end as at 32 to seat frame 26, while housing 28 is shown as being welded, as W, to the lower end of one leg of an inverted U-shaped (FIG. 1) frame member 30A of seat back frame 30. A horizontal lower cross-frame member 30B is welded at each end to one of the housings 28, the housings 28 thus functioning both to enclose a locking mechanism to be described in greater detail below, and also constituting a mounting bracket used in the seat back frame.

As best seen in FIG. 2, coupling bar 24 takes the form of a simple elongate rigid bar of rectangular transverse cross-section having one continuous longitudinal straight side edge 34. A locking recess 36 is formed in the opposite longitudinal side edge 37 of bar 24. In FIG. 2, the lower end of bar 24 is formed for pivotal mounting on seat base frame 26 where the bar is to be fixedly mounted upon the seat base frame 26, the lower end may be shaped somewhat differently to accommodate mounting bolts or shaped to facilitate welding of the bar to the seat frame. The upper end of bar 24 may be formed with one or more inclined cam surfaces, such as 38.

Figure 3:
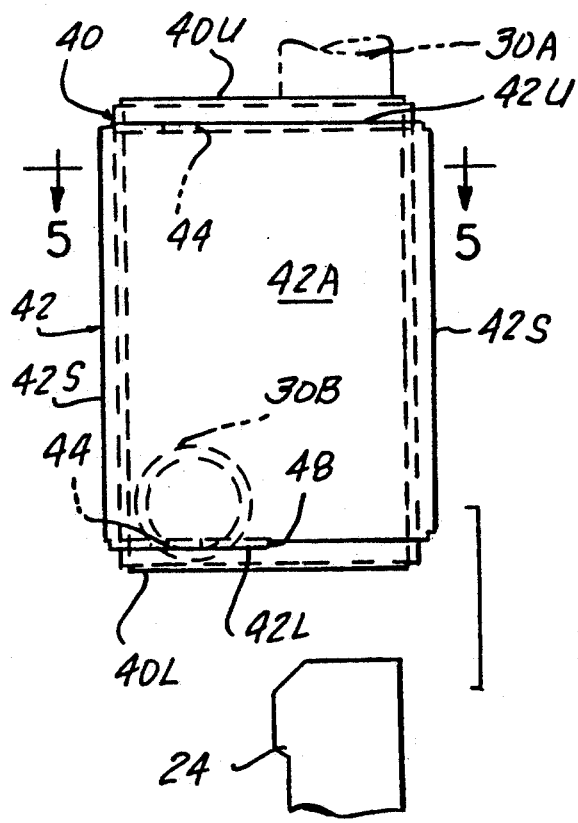
FIG. 3 is a rear view of a housing of a seat back attachment device and a portion of a coupling bar of the present invention.
Figure 5:
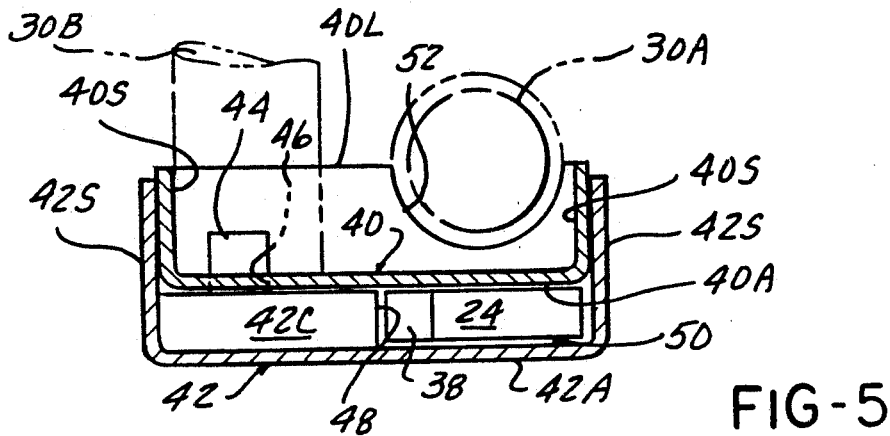
FIG. 5 is a cross-sectional view of the structure of FIG. 3 taken on line 5—5 of FIG. 3.

Housing 28 is formed of two sheet metal stampings formed into what will be referred to as an inner housing unit designated generally 40 and an outer housing unit designated generally 42. Both housing units are formed with a generally rectangular main or back wall 40A, 42A respectively with upper and lower end walls 40U, 40L and 42U, 42L and a pair of side walls 40S, 42S being bent forwardly from the respective top, bottom and opposed side edges of the main or back walls 40A, 42A. The side walls 42S of outer housing 42 project forwardly from the back wall 42A by a substantially greater distance than do the upper and lower end walls 42U, 42L of housing 42, as best seen in FIGS. 2 and 4. The inner and outer housing units 40, 42 are assembled to each other by a simple press fit in which the side walls 40S of inner housing unit 40 are tightly gripped between the side walls 42S of the outer housing 42. The units 40 and 42 may then be permanently joined by spot welds or stitching. Locating tabs 44 project forwardly from the front edges of the upper and lower end walls 42U, 42L of outer housing 42 to pass forwardly through slots 46 (FIGS. 2 and 5) formed in the main or rear wall 40A of inner housing unit 40. As best seen in FIGS. 2 and 5, the lower side wall 42L of outer housing 42 extends from the left-hand side wall 42S as viewed in FIGS. 2, 3 and 5, only about one-half of the way across the lower side of outer housing 42, terminating at an end edge 48. When the two housings are assembled to each other, the upper and lower end walls 42U, 42L hold the back wall 42A of outer housing unit 42 spaced rearwardly from the back wall 40A of inner housing unit 40 to form, as best seen in FIGS. 4 and 5, a closed or recessed chamber having a slotlike opening in its bottom wall constituted by the space 50 between edge 48 of lower wall 42L (FIG. 5) and the right-hand side wall 42S. As best seen in FIG. 5, this slot-like opening 50 is conformed to the cross-sectional configuration of coupling bar 24 so that during the seat back mounting operation, the upper end of coupling bar 24 may be inserted upwardly into the recess between the back walls 40A and 42A through the slot-like opening 50.

As best seen in FIG. 5, the lower wall 40L of inner housing 40 is formed, near one end, with a semi-circular recess 52 of a diameter equal to that of the outer diameter of the tubular seat back frame member 30A. A similar semi-circular recess 52 is formed (see FIG. 2) in the upper end wall 40L of the inner housing unit 40, the two recesses 52 being aligned so that the inner housing unit 40 may be seated upon the tubular frame member as shown in FIG. 2 and welded to the frame member as by weld W. This arrangement for mounting the housing upon the seat back frame 30 results in an extremely rigid seat frame since the tubular frame member 30A does not need to be flattened or drilled to accommodate mounting bolts. As noted above, the horizontal cross-frame member 30B can be easily mounted to the housing by abutting its end against the inner side of back wall 40A of inner housing unit 40, as indicated in broken line in FIGS. 4 and 5, and welding member 30B to wall 40A.

Various forms of locking devices are positioned within the housing recess above the lower end wall 42L of outer housing unit 42.

A first form of locking device is shown in FIGS. 6 and 7. In this form of the invention, a locking member 60 is slidably received within the housing between walls 40A and 42A and extends vertically upwardly from lower end wall 42L to the upper end wall 42U of the outer housing. The right-hand side edge of locking member 60, as viewed in FIG. 6, is formed with a locking projection 62 complementary in shape to the locking recess 36 formed in coupling bar 24. The opposite side edge 64 of member 60 is inclined downwardly and rearwardly.

A locking wedge 66 is supported between the inclined rearward edge 64 of locking member 60 and the rearward side wall 42S of the housing. The side edge 68 of locking wedge 66 which faces locking member 60 is inclined at an inclination matching that of the inclined edge 64 of member 60.

A tapped bore 70 extending vertically through locking wedge 66 threadably receives a screw 72 whose head 74 rests upon lower end wall 42L as best seen in FIG. 6. A U-shaped tab 76 is bent inwardly from the adjacent side wall 42S of housing unit 42 to straddle the shank of screw 72 and to provide a downwardly facing surface against which the head 74 of the screw can act to pull locking wedge 66 downwardly when screw 72 is advanced upwardly through bore 70. Lower end wall 42L is formed with a bore 78 of a diameter smaller than that of the diameter of screw head 74 to support screw 72 and to provide access for an Allen wrench to be seated in head 74 to rotate the screw.

Wedge member 68 is normally maintained in the elevated position shown in FIG. 6 by adjusting the screw in wedge member 66 until the engagement of head 74 with lower end wall 42L supports wedge member 66 at the desired height. When in this elevated position, locking member 60 can be positioned a sufficient distance to the left, as viewed in FIG. 6, so that its locking projection 62 is withdrawn to the left of edge 4 to provide clearance for relative vertical movement between the housing 28 and a coupling bar 24 to enable the coupling bar to be inserted upwardly into the housing to the broken line position shown in FIG. 6 at which the top of bar 24 abuts upper end wall 42U. Screw 72 is then tightened to draw locking wedge 66 downwardly, this downward movement of wedge member 66 wedging locking member 60 outwardly to the right, as viewed in FIG. 6, to seat the locking projection 62 tightly in the aligned locking recess 36 in the coupling bar 24 to positively lock the bar and housing to each other. When the bar 24 and housing 28 are respectively mounted upon a seat base 22 and a seat back 20 as in FIG. 1, the interlocked housing and bar firmly and positively hold the seat base and seat back in assembled relationship with each other.

The embodiment of FIGS. 6 and 7 may be provided with a compression spring 80 engaged between a spring seat 82 formed on or secured to upper end wall 42U of outer housing 42 and the top side of locking wedge 66 to bias wedge 66 downwardly to resist disengaging movement of locking member 60 from bar 24.

A second form of locking arrangement is shown in FIGS. 8 and 9 and includes a locking member 60A substantially identical to the locking member 60 of the embodiment of FIG. 6 and a wedge member 66A which is very similar to the wedge member 66 of the FIG. 6 embodiment. Reference numerals with the subscript A are employed in FIGS. 8 and 9 identify correspondingly numbered parts or features of the embodiment of FIGS. 6 and 7.

In the embodiment of FIGS. 8 and 9, the locking wedge 66A is releasably latched in the elevated position which accommodates the withdrawal of locking member 60A to the left to a position clear of the path of movement of the coupling bar 24A to its locking position. The locking wedge 66A is formed with a L-shaped slot 90 which does not extend through the complete thickness of wedge 66A as best seen in FIG. 9. A horizontal slot 92 substantially co-extensive with the horizontal leg of L-shaped slot 90 is cut through rear wall 40A of the inner housing, and a second horizontal slot 94 is cut through wall 40A near the righthand edge of this wall. A generally U-shaped latch member 96 is formed with legs 98 and 100 which respectively project rearwardly through slots 92 and 94 as best seen in FIG. 9. A holding tab 101 (FIG. 9) may be formed on or attached to wall 40A to retain latch member 96 on the housing. The length of latch member 96 and the dimensions of legs 98 and 100 are matched to the dimensions and spacing between slots 92 and 94 so that when the latch member is at its left-hand limit of movement, as viewed in FIGS. 8 and 9, the leg 98 of latch member 96 projects through slot 92 into the toe portion 102 (FIG. 8) of L-shaped slot 90 to hold wedge member 66A in the elevated non-locking position shown in FIG. 8 against the action of a biasing spring 80A seated in a spring seat 82A and engaged with the top of wedge member 66A. Spring 80A of the FIG. 8 embodiment is a substantially stiffer spring than the spring 80 of the FIG. 6 embodiment.

The coupling bar 24A of the FIGS. 8 and 9 embodiment is formed with an inclined cam surface 104 (FIG. 8) which, upon upward movement of bar 24A relative to the housing, will engage the leg 100 of the latch member when in the latching position shown in FIG. 8, and upon continued upward movement of coupling bar 24A, will force leg 100, and the latching member 96 as a whole, to the right to shift the opposite leg 98 of the latch member into alignment with the vertical leg of the L-shaped slot 90 in with member 66A. When latching leg 98 is aligned with the vertical leg of slot 90, it no longer maintains latch member 66A against downward movement, and spring 80A will drive wedge 66A downwardly to force locking member 60A into locked engagement with the coupling bar 24A.

A third form of locking device is shown in FIGS. 10–12. In this third form of locking device, a locking member 60B of an overall shape the same as that of locking members 60 and 60A of the previously-described embodiments is formed with a transversely extending slot 110, best shown in FIG. 12, which extends transversely across but not entirely through member 60B. A detent recess 112 is formed in the top of slot 110, and a onepiece resilient sheet metal latching member 114 is formed to be seated in slot 110. A resilient detent-like bump 116 is formed, as best seen in FIG. 12, on latch member 114 adjacent one end of the latch member, while a latch toe portion 118 is disposed at the opposite end of member 114. A recess 120 extends between toe portion 118 and the detent portion which carries the detent bump 116.

As best seen in FIG. 12, the locking wedge 66B is again formed with an L-shaped slot designated generally 121 having a vertical leg portion 122 and a slightly downwardly inclined transverse leg portion 124. The leg portion 124 and slot 110 in locking member 60B extend extending parallel to each other. That portion of locking wedge 66B in front of the vertical leg portion 122 of the L-shaped slot and above the transversely extending portion 124 of the L-shaped slot is cut back to be of reduced thickness as compared to the remainder of the unslotted portion of member 66B the recess 120 in latch member 114 being dimensioned to clear this reduced thickness portion. In FIG. 10 the device is shown in its non-locking position with a coupling bar 24B being inserted upwardly into the housing. The latch member 114 is seated in slot 110 in locking member 60B with its detent bump seated in detent recess 112 in member 60B resiliently hold latch member 110 against movement in either direction along slot 110. Latch member 114 projects into the transversely extending portion 124 of the L-shaped slot in locking wedge 60B. In FIG. 10, toe portion 118 (FIG. 12) of latch member 114 is engaged beneath the top wall 126 of slot portion 124 to hold wedge member 66B in the elevated position shown in FIG. 10 against the biasing action of spring 80B. Coupling bar 24B is provided with a cam surface 128 at its upper end which, upon movement of member 24B upwardly from the full line position shown in FIG. 10 to the broken line position, will shift cam surface 128 into contact with the right-hand end of latch member 114. Continued upward movement of coupling bar 24B will cause cam surface 128 to push latch member 114 to the left as viewed in FIG. 10, this movement being initially resisted by the detent-like engagement between the latch member and detent recess 112. However, eventually the detent is overcome and further upward movement of coupling bar 24B will drive member 114 to the left until its toe portion moves out from beneath upper wall 126 into vertical alignment with the vertically extending leg portion 122 of the L-shaped slot in the wedge member. At this time, as in the previously described embodiment of FIG. 8, spring 80B will drive wedge member 66B downwardly to force locking member 60B into engagement with coupling bar 24B as shown in FIG. 11.

To uncouple the bar 24B the lower end wall 42L of the housing is formed with a tapped bore 130 through which a screw 5 may be threaded as indicated in broken line in FIG. 11 to drive wedge member 66B upwardly to the elevated position of FIG. 10 against the action of spring 80B. A similar arrangement may be employed in connection with the embodiment of FIGS. 8 and 9.

While various embodiments of the invention have been described in detail, it will be apparent to those skilled in the art the disclosed embodiments may be modified. Therefore, the foregoing description is to be considered exemplary rather than limiting, and the true scope of the invention is that defined in the following claims.

I claim:

1. In a seat assembly including a seat base having seat base frame, a seat back having a seat back frame, and attachment means for mounting said seat back frame upon said seat base frame;

the improvement wherein said attachment means comprises an elongate rigid coupling bar having a lower end mounted on said seat base frame and projecting upwardly from said seat base, a housing fixedly mounted adjacent a bottom of said seat back frame, means defining a coupling bar receiving recess in said housing extending upwardly from a bottom of said housing and defined in part by a first side wall slidably engageable with a first longitudinal side edge of said bar upon upward movement of said bar into said recess, a locking member mounted in said housing and having a locking edge in facing opposed relationship to a second longitudinal side edge of said bar opposite said first edge and movable within said housing along a fixed path toward and away from said bar, wedge means mounted in said housing between a wall of said housing and said locking member for movement between an elevated inoperative position and a lowered locking position, said wedge means when in said inoperative position allowing movement of said coupling bar into said housing, actuating means for shifting said wedge means from said inoperative position to said locking position, said second edge of said bar having a locking recess therein and said locking edge of said locking member having a locking projection of a shape complementary to said locking recess, said wedge means being operable upon movement from said inoperative position toward said locking position to wedge said locking member toward said bar to seat said locking projection in said locking recess when said wedge means is in said locking position to positively lock said bar against withdrawal from said recess.

2. The invention defined in claim 1 wherein said actuating means comprises spring means engaged between said housing and said wedge means biasing said wedge means toward said locking position.

3. The invention defined in claim 1 wherein said actuating means comprises a screw operatively engaged between said housing and said wedge means.

4. The invention defined in claim 1 wherein said housing comprises first and second sheet metal housing members each having a generally rectangular main wall and upper and lower end walls and opposite side walls projecting perpendicularly forwardly from the respective end and side edges of said main wall, said first housing member having its opposite side walls nested between the opposite side walls of said second housing member, locating tabs projecting forwardly from the upper and lower end walls of said second housing member through locating slots in the main wall of said first housing member, said end walls of said second member spacing the main wall of said second member rearwardly from the main wall of said first housing member to define said coupling bar receiving recess therebetween, said recess being bounded by said main walls, the upper and lower end walls of said second member and the opposite side walls of said second member, and means defining a coupling bar receiving opening in the lower end wall of said second member constituting the entrance to said recess.

5. The invention defined in claim 4 wherein said seat back frame includes a generally vertical tubular frame member;
the further improvement comprising means defining aligned concave recesses in the upper and lower end walls of said first housing member conformed to receive said vertical tubular frame member, said vertical frame member being welded to said upper and lower end walls of said first housing member.

6. The invention defined in claim 1 wherein said actuating means comprises releasable latch means for releasably latching said wedge means in said inoperative position, spring means biasing said wedge means toward said locking position, and cam means engageable between said coupling bar and said latch means for releasing said latch means in response to upward movement of said bar in said recess.

7. The invention defined in claim 6 further comprising means defining a threaded bore in said housing for receiving a screw operable when threaded into said bore to engage said wedge means and to drive said wedge means from said locking position to said inoperative position against the biasing action of said spring means.

8. The invention defined in claim 6 wherein said wedge means comprises a plate-like wedge member having opposite side edges respectively slidably engageable with a second side wall of said housing and an inclined side edge of said locking member opposite said locking edge, said wedge member having an L-shaped slot therein having a first leg portion parallel to said second side wall and a second leg portion extending from one end of said first leg portion transversely of said second side wall, said latch means comprising a latch member mounted for sliding movement along a path parallel to said second leg portion and having a latch tooth projecting into said L-shaped slot operable to retain said wedge means in said inoperative position when said tooth is located in said second leg portion of said slot and operable to accommodate movement of said wedge means between said inoperative position and said locking position when said tooth is located in said first leg portion of said slot.

9. The invention defined in claim 6 wherein said wedge means comprises a plate-like wedge member slidably engaged between a second side wall of said housing and an inclined edge of said locking member opposite said locking edge, means defining an L-shaped slot in one side of said wedge member having a first leg portion extending parallel to said second side wall and a second leg portion extending transversely from one end of said first leg portion, said latch means comprising a latch member having a latch tooth operable when received in said second leg portion of said slot in said wedge member to retain said wedge means in said inoperative position and operable to release said latch means when said tooth is located in said first leg portion of said slot, and mounting means mounting said latch member for movement relative to said housing in a direction parallel to said second leg portion of said slot.

10. The invention defined in claim 9 wherein said mounting means comprises means defining a guide slot in said housing extending parallel to said second leg portion of said L-shaped slot and slidably receiving said latch tooth, said cam means comprising a projection on said latch member projecting into the path of movement of said coupling bar when said latch tooth is received in said second leg portion, and a cam surface on said bar engageable with said projection to drive said latch member in sliding movement shifting said latch tooth from said second leg portion into said first leg portion in response to upward movement of said bar relative to said housing.

11. The invention defined in claim 9 further comprising means defining a latch member receiving guide slot in said locking member extending transversely across said locking member in a direction parallel to said second leg portion of said L-shaped slot in said wedge member, said latch member having a body portion slidably received in said guide slot and having said latch tooth located at one end of said body portion, the opposite end of said body portion projecting from said locking member into the path movement of said coupling bar when said latch tooth is in said second leg portion of said L-shaped slot, and a cam surface at the upper end of said coupling bar engageable with said opposite end of said body portion for shifting said latch member to move said tooth into said first portion of said L-shaped slot in response to upward movement of said coupling bar within said recess in said housing.

12. The invention defined in claim 11 further comprising detent means engageable between said locking member and said latch member for releasably retaining said latch tooth within said second leg portion of said L-shaped slot.

13. In a seat assembly including a seat base having a first frame, a seat back having a second frame, and attachment means for mounting said first frame on said second frame, the improvement wherein said attachment means comprises:

an elongate rigid coupling bar mounted on one of said first and second frames and having a first end projecting outwardly therefrom, said coupling bar further having a first longitudinal side edge and a second longitudinal side edge opposite said first edge, said second edge of said bar having a locking recess formed therein;

a housing fixedly mounted on the other of said first and second frames for cooperative engagement with said bar;

means defining a bar receiving recess extending into said housing and defined in part by a first side wall slidably engageable with said first edge of said bar during movement of said bar into said recess;

a locking member having a locking edge of a shape complementary to said locking recess of said bar, said locking member movable within said housing along a fixed path toward and away from said bar;

wedge means mounted in said housing for moving said locking member between a first position allowing movement of said bar into said housing and a second position positively locking said bar against withdrawal from said recess; and actuating means for moving said locking member from said first position to said second position to seat said locking projection in said locking recess.

14. The improvement of claim 13 wherein said actuating means comprises:

spring means engaged between said housing and said wedge means biasing said locking member toward said second position.

15. The improvement of claim 14 wherein said actuating means comprises:

means defining a threaded bore in said housing for receiving a screw operable when threaded into said bore to engage said wedge means and to drive said locking member from one of said first and second positions to the other of said first and second positions against the biasing action of said spring means.

16. The improvement of claim 13 wherein said actuating means comprises:

releasable latch means for releasably latching said locking member in said first position;

spring means biasing said locking member toward said second position; and cam means engageable between said bar and said latch means for releasing said latch means in response to upward movement of said bar in said recess.

17. The improvement of claim 16 wherein said wedge means comprises:

a plate-like wedge member having a opposite side edges respectively slidably engageable with a second side wall of said housing and an inclined side edge of said locking member opposite said locking edge, said wedge member having an L-shaped slot therein having a first leg portion parallel to said second side wall and a second leg portion extending from one end of said first leg portion transversely of said second side wall; and wherein said latch means comprises a latch member mounted for sliding movement along a path parallel to said second leg portion and having a latch tooth projecting into said L-shaped slot operable to retain said locking member in said first position when said tooth is located in said second leg portion of said slot and operable to accommodate movement of said locking member between said first position and said second position when said tooth is located in said first leg portion of said slot.

18. The improvement of claim 16 wherein said wedge means comprises:

a plate-like wedge member slidably engaged between a second side wall of said housing and an inclined edge of said locking member opposite said locking edge;

means defining an L-shaped slot in one side of said wedge member having a first leg portion extending parallel to said second side wall and a second leg portion extending transversely from one end of said first leg portion; and wherein said latch means comprises a latch member having a latch tooth operable when received in said second leg portion of said slot in said wedge member to retain said locking member in said first position and operable to release said latch means when said tooth is located in said first leg portion of said slot, and mounting means mounting said latch member for movement relative to said housing in a direction parallel to said second leg portion of said slot.

19. The improvement of claim 17 further comprising:

means defining a latch member receiving guide slot in said locking member extending transversely across said locking member in a direction parallel to said second leg portion of said L-shaped slot in said wedge member;

said latch member having a body portion slidably received in said guide slot and having said latch tooth located at one end of said body portion, the opposite end of said body portion projecting from said locking member into the path of movement of said bar when said latch tooth is in said second leg portion of said L-shaped slot; and a cam surface at the upper end of said bar engageable with said opposite end of said body portion for shifting said latch member to move said tooth into said first portion of said L-shaped slot in response to movement of said bar within said recess in said housing.

20. The improvement of claim 18 wherein said mounting means comprises:

means defining a guide slot in said housing extending parallel to said second leg portion of said L-shaped slot and slidably receiving said latch tooth; and wherein said cam means comprises a projection on said latch member projecting into the path of movement of said bar when said latch tooth is received in said second leg portion, and a cam surface on said bar engageable with said projection to drive said latch member in sliding movement shifting said latch tooth from said second leg portion into said first leg portion in response to a movement of said bar relative to said housing.

* * * * *

UNITED STATES PATENT AND TRADEMARK OFFICE
CERTIFICATE OF CORRECTION

PATENT NO. : 5,253,923
DATED : October 19, 1993
INVENTOR(S) : Leroy Gootee

It is certified that error appears in the above-indentified patent and that said Letters Patent is hereby corrected as shown below:

Column 3, line 58, should read--plane-- after "on a"--.

Signed and Sealed this

Twenty-sixth Day of April, 1994

Attest:

BRUCE LEHMAN

Attesting Officer          Commissioner of Patents and Trademarks